US008997968B2

(12) United States Patent
Braasch et al.

(10) Patent No.: US 8,997,968 B2
(45) Date of Patent: Apr. 7, 2015

(54) AUTOMATIC ADJUSTMENT OF PARAMETERS FOR SAFETY DEVICE

(75) Inventors: Burkhard Braasch, Berlin (DE); Peter Herkel, Berlin (DE); Ruediger Loeb, Hennigsdorf (DE); Ingo Engelhard, Berlin (DE); Michael Wilke, Berlin (DE)

(73) Assignee: Otis Elevator Company, Farmington, CT (US)

( * ) Notice: Subject to any disclaimer, the term of this patent is extended or adjusted under 35 U.S.C. 154(b) by 205 days.

(21) Appl. No.: 13/260,519

(22) PCT Filed: Apr. 20, 2009

(86) PCT No.: PCT/US2009/041116

§ 371 (c)(1), (2), (4) Date: Nov. 15, 2011

(87) PCT Pub. No.: WO2010/123489

PCT Pub. Date: Oct. 28, 2010

(65) Prior Publication Data

US 2012/0043180 A1 Feb. 23, 2012

(51) Int. Cl.
*B65G 43/00* (2006.01)
*B66B 29/00* (2006.01)

(52) U.S. Cl.
CPC .................................... *B66B 29/005* (2013.01)

(58) Field of Classification Search
USPC .................................................. 198/322, 323
See application file for complete search history.

(56) References Cited

U.S. PATENT DOCUMENTS 5,361,887 A * 11/1994 Zaharia et al. ................ 198/323
5,842,554 A * 12/1998 Stoxen et al. ................. 198/322
6,112,166 A * 8/2000 Joosten ......................... 702/185
6,230,871 B1 * 5/2001 Balzer-Apke et al. ........ 198/323
6,267,219 B1 * 7/2001 Spannhake et al. ........... 198/323
6,273,234 B1 * 8/2001 Balzer-Apke et al. ........ 198/323
7,520,806 B2 * 4/2009 Bundy et al. ...................... 460/6
7,544,918 B2 * 6/2009 Herzog ......................... 219/653
2003/0168311 A1 * 9/2003 Balzer-Apke et al. ........ 198/323
2007/0072158 A1 * 3/2007 Unuma et al. ................ 434/247
2009/0266674 A1 * 10/2009 Mueller et al. ................ 198/322
2011/0011700 A1 * 1/2011 Plathin et al. ................. 198/323

FOREIGN PATENT DOCUMENTS

CN 101386395 B * 6/2011
DE 19754141 A1 6/1999
JP H0455289 A 2/1992
JP H0485292 A 3/1992
JP H09510170 A 10/1997
JP 2004505874 A 2/2004

(Continued)

*Primary Examiner* — Gene Crawford
*Assistant Examiner* — Lester Rushin
(74) *Attorney, Agent, or Firm* — Miller, Matthias & Hull LLP

(57) ABSTRACT

A device and method for automatically adjusting safety control parameters of a conveyor are disclosed. The safety device may include various sensors and a safety control module. The safety control module may be preprogrammed with a learn-run method configured to learn operational and mechanical characteristics of a conveyor, validate the operational characteristics of the conveyor based on predefined nominal specifications, and determine a safety function with calibrated safety control parameters by which to monitor conveyor operation.

20 Claims, 3 Drawing Sheets

(56) References Cited

FOREIGN PATENT DOCUMENTS

| | | | |
|---|---|---|---|
| JP | 2004123348 | A1 | 4/2004 |
| JP | 2009073621 | A | 4/2009 |
| JP | 2009073621 | A1 | 4/2009 |
| WO | WO 98/18712 | | 5/1998 |

* cited by examiner

AUTOMATIC ADJUSTMENT OF PARAMETERS FOR SAFETY DEVICE

CROSS-REFERENCE TO RELATED APPLICATIONS

This application is a U.S. national stage filing of International Patent Application No. PCT/US09/41116, filed on Apr. 20, 2009.

FIELD OF THE DISCLOSURE

The present disclosure generally relates to safety control systems, and more particularly, relates to devices and methods for automatically adjusting and calibrating parameters within a safety control system for conveyors.

BACKGROUND OF THE DISCLOSURE

Conveyors, such as escalators, travelators, moving walkways, and the like, provide a moving pathway to quickly and conveniently transport people from one location to another. More specifically, the moving pallets or steps of a conveyor move passengers along the length of the pathway between two landing platforms at predetermined rates of speed. Step chains hidden from view and disposed underneath the conveyor serve to interconnect each of the steps in a closed loop fashion. Driven by a main drive source, drive shafts and associated sprockets, the step chains move the steps along an exposed upper surface of the conveyor to transport passengers between the landing platforms. Sprockets disposed within each of the two landing platforms guide the step chains through an arc to reverse the direction of step movement and to create a cyclic return path.

Because of their continual motion, conveyors are prone to various internal failures, which may further cause injury to passengers on or near the conveyor. One such failure is associated with the speed of the conveyor, or the velocity at which the steps of a conveyor travel between landing platforms. The speed of the conveyor may deviate or fluctuate from a predefined nominal speed causing the steps of a conveyor to move too fast, too slow, stop abruptly, accelerate too quickly, or the like. Inconsistencies in the speed of a conveyor may be caused by several factors. However, in most occurrences, inconsistencies in the speed of a conveyor may be caused by fluctuations in the power supplied to the main drive source of the conveyor. For instance, overvoltage, undervoltage, power surges, spikes, or other inconsistencies in the power supplied to the conveyor, may cause variations to the conveyor which accumulate over time and ultimately offset a predefined nominal speed thereof. Power fluctuations may also hinder the ability of the conveyor to stop within predefined times or distances as required by safety protocols.

Other failures pertain to misaligned or missing pallets or steps. Over time, one or more steps of a conveyor may break loose from the associated step chains causing the steps to drop or fall beneath the conveyor system undetected. Missing steps may also be caused by improper maintenance. Conveyors require periodic maintenance in which one or more steps may be removed, replaced, or the like. However, if a step is not properly fastened or realigned with the step chains, the step may break loose and fall. In any event, if a control system of a conveyor fails to detect a void caused by a missing step, the conveyor may continue to operate, advance the void to the upper surface of the conveyor and expose the void to passengers. Unknowing passengers may fall or step into the void and become injured.

Accordingly, escalators and travelators are provided with various safety measures which serve to minimize hazards caused by such fault conditions. For instance, periodic maintenance may be performed on site by service technicians to ensure proper operation of the conveyor. However, such maintenance is timely, costly and introduces the risk of human error. Other safety measures may employ safety monitoring devices. Specifically, conveyors may be provided with a safety monitoring device which monitors operation of the conveyor for fault conditions. When a fault has been detected, safety monitoring devices may be configured to transmit correctional instructions to a control unit of the conveyor or simply halt operation of the conveyor until the fault is manually cleared by a service technician. However, conveyors may also be required to operate in compliance with safety codes and regulations associated a conveyor type, location, application, and the like. As the type, location and application of each conveyor is different, the safety monitoring device associated with each conveyor must also be different.

In particular, the safety monitoring device for each conveyor must be specifically designed, configured and preprogrammed for that particular conveyor, which amounts to a considerable amount of time and money spent for building each conveyor system. This also means that existing safety devices are not adaptable to any other conveyor type or application, and further, cannot be upgraded to comply with changing conditions, such as new conveyor safety codes and regulations. In order to comply with changing safety codes and regulations, currently existing safety devices, or the conveyor system as a whole, may need to be replaced. Such a service requires a considerable amount of money as well as downtime for the end user.

Therefore, there is a need for a robust and universal control system which monitors the safety parameters of a conveyor system in a more timely and cost efficient manner. More specifically, there is a need for a safety control system that is adaptable to a wide variety of different conveyor types and local safety regulations, and further, monitors conveyor step presence, step speed, stopping distance, and other safety control parameters. Furthermore, there is a need for a control system which automatically determines the operational and mechanical characteristics of an associated conveyor, self-calibrates the necessary safety parameters, and monitors the parameters according to safety codes specific to the conveyor.

SUMMARY OF THE DISCLOSURE

In accordance with one aspect of the disclosure, an apparatus for automatically adjusting safety control parameters of a conveyor having a plurality of steps extending between a first platform and a second platform, the steps being interconnected by a step chain and driven by a main drive component is provided. The apparatus comprises a plurality of sensors configured to output at least a step speed signal and a step detection signal; and a safety control module in communication with the sensors and in communication with a conveyor control unit, the safety control module configured to automatically determine operational and mechanical characteristics of the conveyor based on outputs of the sensors, validate the operational characteristics of the conveyor based on predefined nominal specifications, and determine safety control parameters corresponding to the validated operational characteristics of the conveyor by which to monitor conveyor operation.

In accordance with another aspect of the disclosure, a method for automatically adjusting safety control parameters of a conveyor having a plurality of steps extending between a first platform and a second platform, the steps being interconnected by a step chain and driven by a main drive component is provided. The method comprises the steps of determining operational and mechanical characteristics of the conveyor based on outputs of a step speed sensor and a step detection sensor; validating the operational characteristics of the conveyor based on predefined nominal specifications; and determining safety control parameters corresponding to the validated operational characteristics of the conveyor by which to monitor conveyor operation.

In accordance with yet another aspect of the disclosure, a method for automatically adjusting safety control parameters of a conveyor having a plurality of steps extending between a first platform and a second platform, the steps being interconnected by a step chain and driven by a main drive component is provided. The method comprises the steps of sampling output signals of a step speed sensor and a step detection sensor for a predefined period of time; determining a measured step speed based on the step speed output signal; determining step speed sensor type based on a frequency of the step speed output signal; determining conveyor step size based on a correlation between the step speed and step detection output signals; comparing the measured step speed with a predefined step speed; comparing a cross-correlation between sensor output signals with a predefined tolerance; and determining safety control parameters only if both of the measured step speed and the cross-correlation between sensor output signals are within predefined tolerances.

These and other aspects of this disclosure will become more readily apparent upon reading the following detailed description when taken in conjunction with the accompanying drawings.

Figure 1:
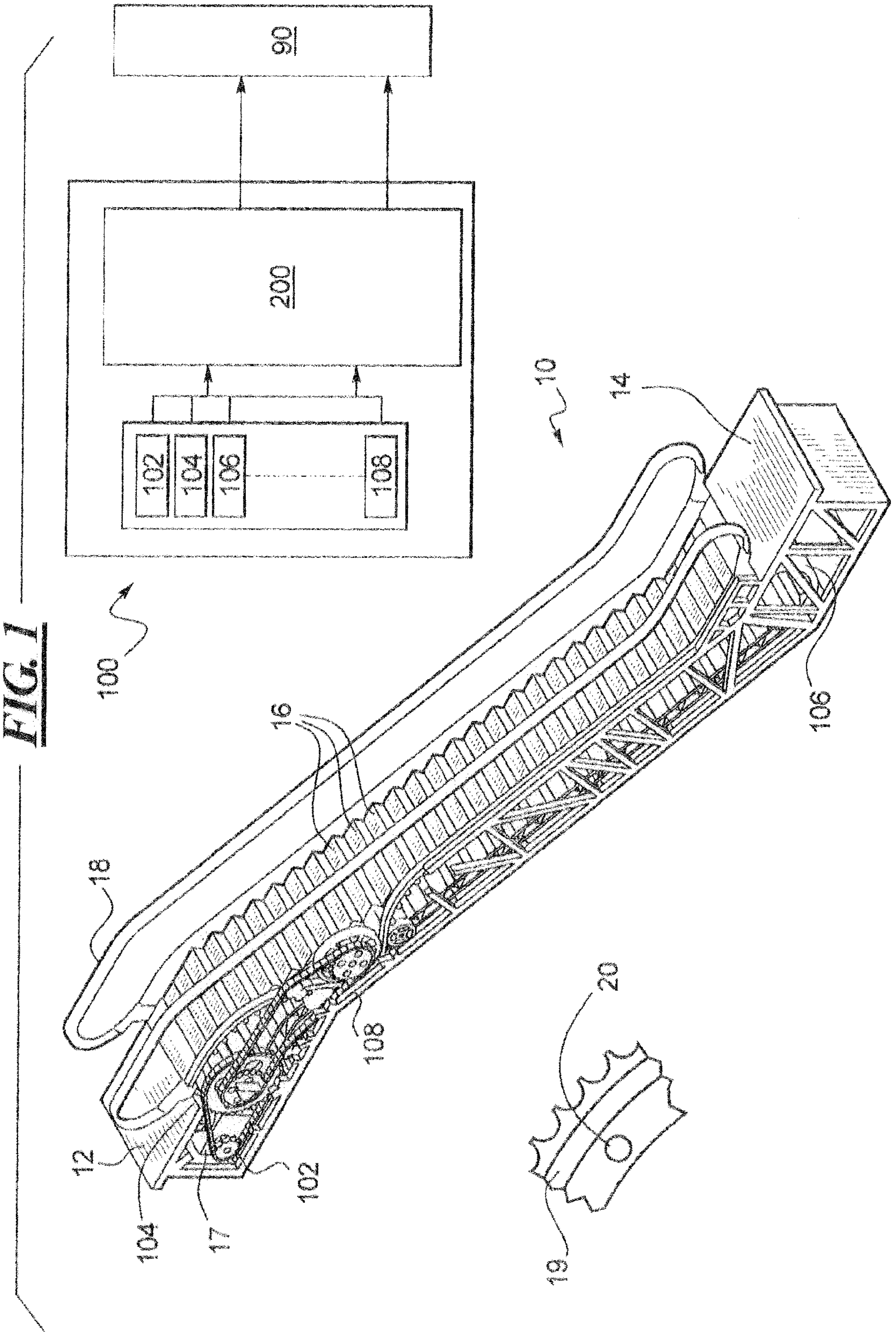
FIG. 1 is a perspective view of a conveyor incorporating an exemplary safety device for automatically adjusting safety control parameters constructed in accordance with the teachings of the disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring to the drawings and with particular reference to FIG. 1, an exemplary safety device for a conveyor is provided and referred to as reference number 100. It is understood that the teachings of the disclosure can be used to construct devices for automatically adjusting safety control parameters above and beyond that specifically disclosed below. One of ordinary skill in the art will readily understand that the following are only exemplary embodiments.

As shown in FIG. 1, an exemplary conveyor 10 in the form of an escalator is provided having a first platform 12, a second platform 14, a plurality of moving pallets or steps 16 extending between the first and second platforms 12, 14, as well as moving handrails 18 disposed alongside the plurality of steps 16. The steps 16 of the conveyor 10 are driven by a main drive source 17, such as an electric motor, or the like, and are caused to move between the platforms 12, 14. The main drive source 17 rotates a drive shaft and associated gears to rotate closed loop step bands or chains which mechanically interconnect the inner surfaces of the steps 16 from within the conveyor 10. Within each of the two landing platforms 12, 14, sprockets 19 guide the step chains and the attached steps 16 through an arc to reverse the direction of step movement and to create a return path in a cyclic manner. The handrails 18 are rotatably moved by similar means alongside the steps 16 at a speed comparable to that of the steps 16.

Still referring to FIG. 1, the conveyor 10 may be provided with a conveyor control unit 90 and the safety device 100 as shown. In general, the conveyor control unit 90 may serve to manage the overall operation and controls of the conveyor system. The safety device 100 may serve to ensure that the conveyor 10 operates in accordance with associated safety codes and regulations. The safety device 100 may also be used in accordance with other guidelines, such as those set forth by the facility within which the conveyor is installed, contract agreements, user-defined specifications, and the like. The safety device 100 may include a plurality of sensors 102, 104, 106, 108 for observing various parameters of the conveyor 10 and a safety control module 200. In particular, the safety device 100 may observe the drive or step speed of the conveyor 10, the speed of the handrails 18, the presence or absence of steps 16 in relation to each of the landing platforms 12, 14, and the like. To determine the step speed, the safety device 100 may provide a step speed sensor 102, such as photoelectric sensors, positioned in close proximity to the teeth 20 of the sprockets 19 which drive the step chain interconnecting the steps 16. Alternatively, the step speed sensor 102 may comprise an encoder positioned on an axis of the sprocket 19 configured to detect the rotational velocity of the sprocket 19. To detect the presence or absence of steps 16, the safety device 100 may include step detection sensors 104, 106 in the landing platforms 12, 14 of the conveyor 10. In particular, the step detection sensors 104, 106 may comprise proximity sensors configured to detect the metal in the step roller or step roller axes of a pallet or step 16. The safety device 100 may also include handrail sensors 108 to observe the relative speed of the handrails 18 with respect to the speed of the steps 16. The safety control module 200 may sample the sensor outputs to initially learn the operational and mechanical characteristics of the conveyor 10, validate the measured data, automatically adjust safety control parameters according to the learned characteristics and safety regulations, and further, monitor conveyor operation for any significant signs of fault or deviation. Once such a fault has been detected, the safety control module 200 may provide the conveyor control unit 90 with the necessary instructions for adjusting conveyor operation accordingly.

Figure 2:
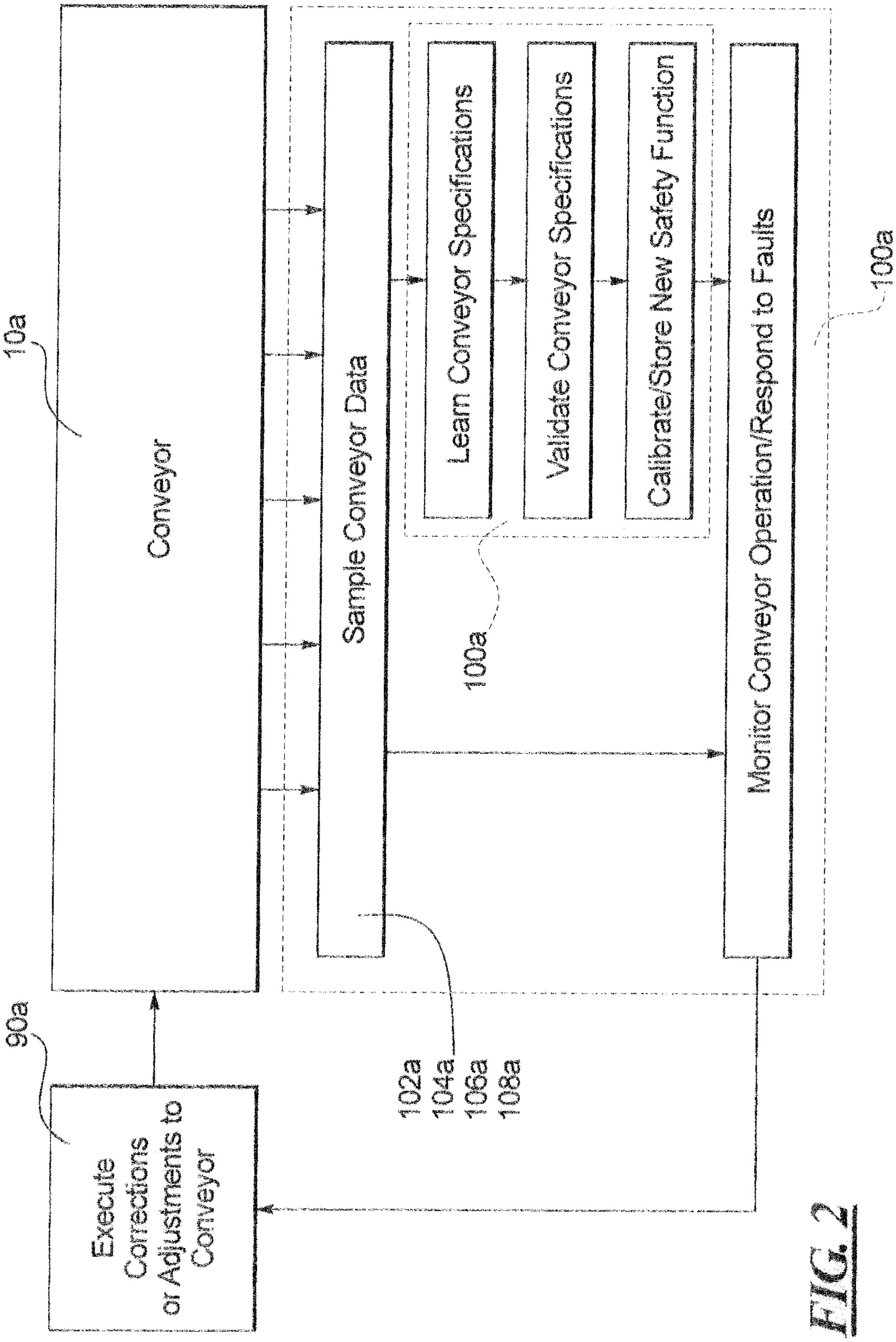
FIG. 2 is a schematic of an exemplary conveyor system incorporating an automatic safety control device.

Referring now to FIG. 2, an overall schematic of an exemplary conveyor system integrated with an automatically adjusting safety device 100*a* is provided. More specifically, the main components of the overall system may include at least a conveyor 10*a*, a conveyor control unit 90*a* and a safety device 100*a*. As in the embodiment of FIG. 1, various sensors 102*a* may be arranged on and within the conveyor 10*a* to measure or sample data specific to the conveyor 10*a* for a predefined period of time during normal operation of the conveyor 10*a*. When initiated, the safety control module 200*a* may use the sampled data provided by the sensors 102*a* to learn the operational and mechanical characteristics of the conveyor 10*a*. Depending on the type of sensors 102*a* provided, the safety control module 200*a* may use the sampled data to determine characteristics such as the conveyor step speed, step size, step pitch, handrail speed, associated gear ratios, as well as the type of sensors being used.

Once all of the required data of the conveyor 10*a* are obtained, the safety control module 200*a* may validate the sampled data, or compare the sampled data with predefined nominal values and thresholds. The predefined values may include nominal conveyor step speeds, step sizes, and the like, as set forth by local safety codes and regulations. The predefined values may also incorporate constraints or limitations introduced by other guidelines, such as contract-specific requirements, user-defined preferences, or the like. If the sampled data is within an acceptable threshold of the predefined nominal value, the safety control module 200*a* may proceed to determine an appropriate safety function and corresponding safety control parameters specific to the conveyor 10*a*. However, if the sampled data is not within an acceptable threshold of the predefined nominal values, the safety control module 200*a* may reject the sampled data and proceed to obtain subsequent samples of conveyor data until validation is successful. If the sampled data is valid and in accordance with respective safety codes and regulations, the safety control module 200*a* may automatically generate a new safety function specific to the conveyor, or automatically adjust an existing safety function previously stored within the safety device 100*a*. More specifically, the safety control module 200*a* may calibrate safety control parameters to the predefined values and store the safety control parameters within the safety device 100*a* for reference.

Using the safety function as a reference, the safety control module 200*a* may further monitor conveyor 10*a* operation for any significant deviation from nominal specifications. If such a deviation is detected, the safety control module 200*a* may communicate the necessary signals to the conveyor control unit 90*a* for correcting the error. For instance, if the safety device 100*a* detects a significant increase in the conveyor step speed, the safety control module 200*a* may instruct the control unit 90*a* to decelerate. In response, the control unit 90*a* may reduce power to a motor driving the conveyor 10*a*, or the like, so as to reduce the conveyor step speed. Once the conveyor step speed returns to a speed that is within acceptable bounds, as set forth by the stored safety function, the safety control module 200*a* may instruct the control unit 90*a* to stop deceleration and maintain the current step speed. Accordingly, the conveyor control unit 90*a* may then maintain the power delivered to the motor.

Referring back to the embodiment of FIG. 1, the safety control module 200 may be realized using a microcontroller, microprocessor, or the like, provided within a control panel of the conveyor 10 so as to be easily accessible by a service technician. The safety device 100 may further include a display or a user interface through which a service technician may view or modify conveyor data. Using such an interface, a service technician may also update the safety control module 200 in accordance with changing safety codes and regulations. In order to adjust or calibrate the safety control parameters of the conveyor 10 in accordance with new safety requirements, the service technician needs only to instruct the safety control module 200 to initiate a learn-run 300.

Figure 3:
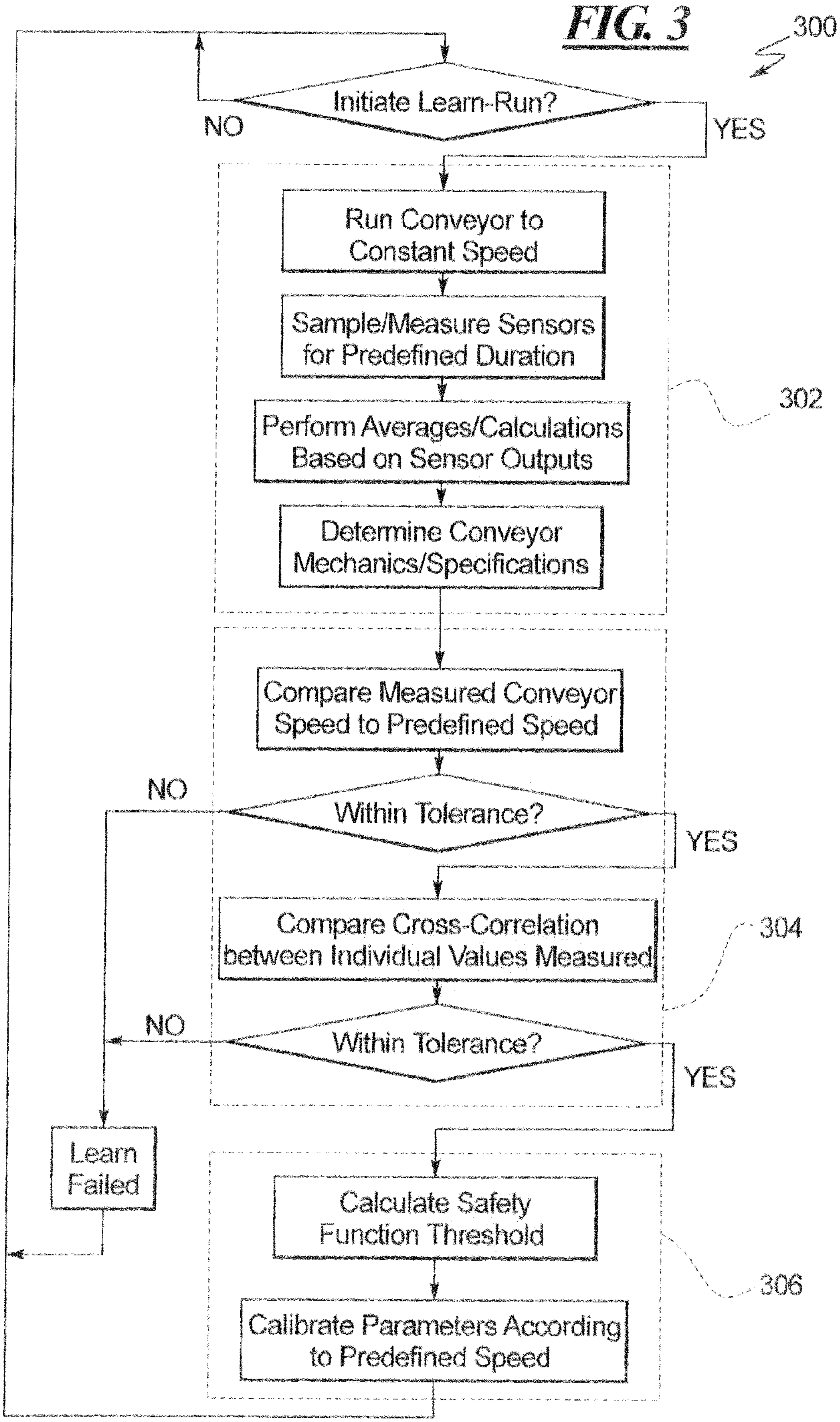
FIG. 3 is a flow chart of an exemplary learn-run method for automatically adjusting safety control parameters of a conveyor.

As disclosed herein, a learn-run 300 may be an algorithm that is preprogrammed within a microprocessor, microcontroller, or the like, to operate according to the steps, as schematically illustrated by the flow diagram of FIG. 3. Before executing the learn-run 300, the learn-run 300 may require one or more preconditions. For example, the learn-run 300 may require the conveyor 10 to be operating at a constant speed for a predetermined duration of time. If the conveyor 10 is an escalator, the learn-run 300 may require the escalator to be operating at a constant speed in a particular direction, upward or downward, before proceeding. The learn-run 300 may also require predefined inputs which may be provided at the time of manufacture or on-site via a service technician. The predefined inputs may be discrete values which specify one or more constraints to which the conveyor 10 should desirably conform. For example, the learn-run 300 may require one or more discrete nominal conveyor step speeds, step or pallet sizes, or the like, that are acceptable by safety standards.

Once all of the preconditions are met and the necessary predefined inputs are received by the safety control module 200, the learn-run 300 may wait for manual input or instructions by a user to initiate the learn-run 300. Upon receiving instructions to initiate, the learn-run 300 may first execute a learn sequence 302. During the learn sequence 302, the learn-run 300 may observe normal operation conditions of the conveyor 10 using various sensors 102, 104, 106, 108 for a predefined period of time. For example, the learn sequence 302 may sample data measured by a step speed sensor 102, step detection sensors 104, 106, a handrail sensor 108, and the like, over a period of 40 seconds or so. Based on the sampled data, the learn sequence 302 may then perform averages and additional calculations to derive key characteristics of the conveyor 10. In particular, the learn sequence 302 may be configured to calculate the measured step speed of the conveyor 10, the average period of each step detection signal, the average period of the of the step speed signal, the average number of step speed signal pulses per period of the step detection signals, the average frequency of the step speed signal, the average period of the handrail signal, and the like. Using such derivations, the learn-run 300 may be able to determine various mechanical traits of the specific conveyor 10. Specifically, the learn sequence 302 may be able to determine the type of step speed sensor 102 being used, proximity or encoder, based on the frequency of the step speed signal provided by the step speed sensor 102. The learn sequence 302 may also determine the conveyor step size, depth and/or pitch, based on the number of step speed signal pulses per period of the step detection signals.

After learning operational and mechanical characteristics of the conveyor 10 during the learn sequence 302, the learn-run 300 may then proceed to the validation sequence 304 of FIG. 3. In the validation sequence 304, the measured step speed of the conveyor 10 may be compared to a predefined step speed. As previously discussed, the safety control module 200 may be preprogrammed and provided with a series of acceptable nominal step speeds. The validation sequence 304 may compare the measured step speed to each of the available predefined step speeds, for example 0.50 m/s, 0.65 m/s, 0.75 m/s and 0.90 m/s, to determine the best match, or the predefined step speed that best approximates the measured step speed. The validation sequence 304 may further determine whether the measured step speed is within a predefined tolerance, for example 5% or 10%, of the selected predefined step speed. As an additional measure, the validation sequence 304 may further determine if the measurements sampled during the learn sequence 302 cross-correlate with one another within a predefined tolerance. Depending on the results, the validation sequence 304 may reject or continue with the learn-run 300. For example, the validation sequence 304 may be configured to reject the learn-run 300 only when both of the measured step speed and the cross-correlation between individual measurements are not within the respective predefined tolerances. Alternatively, the validation sequence 304 may be configured to reject the learn-run 300 when either one of the measured step speed and the cross-correlation between individual measurements is not within the respective predefined tolerance. If a learn-run 300 is rejected or aborted, the learn-run 300 may be restarted automatically or by manual user input.

If the validation sequence 304 is successful, the learn-run 300 may proceed to the calibration sequence 306, as shown in FIG. 3. Based on the learned operational and mechanical characteristics of the conveyor 10, the calibration sequence 306 may automatically generate a new safety function for the particular conveyor 10 and store the safety function for reference. Alternatively, the calibration sequence 306 may automatically adjust the control parameters of an existing safety function. In particular, a safety function may include a series of safety control parameters or thresholds by which the conveyor 10 is to be monitored. The safety parameters may include thresholds pertaining to the conveyor step speed, forward and reverse motion of the steps, missing step detection, stopping distance, handrail speed, and the like. More importantly, the generated safety function and the parameters thereof are automatically calibrated according to the predefined nominal step speeds so as to ensure compliance with safety codes and regulations.

Based on the foregoing, it can be seen that the present disclosure may provide conveyors, such as escalators, travelators, moving walkways, and the like, with safety devices that overcome deficiencies in the prior art. More specifically, the present disclosure provides a safety control device which can automatically adapt to any one of a wide variety of conveyor types and simultaneously ensure compliance with safety codes and regulations specific to the conveyor. By being adaptable, the safety control module facilitates the manufacture, installation and maintenance of conveyors in any environment. By being automatic, the safety control module minimizes downtime and expenses required for servicing conveyors. Furthermore, by reducing the need for maintenance by service technicians, the safety control module additionally minimizes faults introduced by human error.

While only certain embodiments have been set forth, alternatives and modifications will be apparent from the above description to those skilled in the art. These and other alternatives are considered equivalents and within the spirit and scope of this disclosure.

What is claimed is:

1. An apparatus for automatically adjusting safety control parameters of a conveyor having a plurality of steps extending between a first platform and a second platform, the steps being interconnected by a step chain and driven by a main drive component, the apparatus comprising:

- a plurality of sensors configured to output at least a step speed signal and a step detection signal; and
- a safety control module in communication with the sensors and in communication with a conveyor control unit, the safety control module configured to automatically determine operational and mechanical characteristics of the conveyor based on outputs of the sensors, validate the operational characteristics of the conveyor based on predefined nominal specifications, determine safety control parameters corresponding to the validated operational characteristics of the conveyor by which to monitor conveyor operation, and able to modify an existing safety function based on the safety control parameters corresponding to the validated operational characteristics of the conveyor, and store the modified safety function for reference.

2. The apparatus of claim 1, wherein the safety control module further monitors the operational characteristics of the conveyor and communicates instructions for correcting any significant deviation to the conveyor control unit.

3. The apparatus of claim 2, wherein the safety control module monitors step speed, reverse motion, step detection and stopping distance.

4. The apparatus of claim 1, wherein the plurality of sensors are configured to further output a handrail speed signal.

5. The apparatus of claim 1, wherein the operational characteristics are determined at least by calculating an average period of the step speed signal and an average period of the step detection signal.

6. The apparatus of claim 1, wherein the mechanical characteristics include conveyor step size and step speed sensor type.

7. The apparatus of claim 1, wherein the safety control module validates the operational characteristics of the conveyor by comparing measured step speed to a predefined step speed.

8. The apparatus of claim 7, wherein the safety control module further compares a cross correlation between the sensor output signals with a predefined tolerance.

9. The apparatus of claim 1, further comprising a user interface through which the safety control module displays information pertaining to the operational characteristics of the conveyor.

10. A method for automatically adjusting safety control parameters of a conveyor having a plurality of steps extending between a first platform and a second platform, the steps being interconnected by a step chain and driven by a main drive component, the method comprising the steps of:

- determining operational and mechanical characteristics of the conveyor based on outputs of a step speed sensor and a step detection sensor;
- validating the operational characteristics of the conveyor based on predefined nominal specifications;
- determining safety control parameters corresponding to the validated operational characteristics of the conveyor by which to monitor conveyor operation;
- modifying existing safety functions based on the safety control parameters corresponding to the validated operational characteristics of the conveyor; and
- storing the modified safety control functions for reference.

11. The method of claim 10, further comprising the step of monitoring the operational characteristics of the conveyor and communicating instructions for correcting any significant deviation to a conveyor control unit.

12. The method of claim 10, wherein the step of determining operational and mechanical characteristics of the conveyor is further based on output of a handrail sensor.

13. The method of claim 10, wherein the operational characteristics of the conveyor include at least an average period of the step speed signal and an average period of the step detection signal.

14. The method of claim 10, wherein the mechanical characteristics include conveyor step size and step speed sensor type.

15. The method of claim 10, wherein the step validating compares measured step speed to a predefined step speed.

16. A method for automatically adjusting safety control parameters of a conveyor having a plurality of steps extending between a first platform and a second platform, the steps being interconnected by a step chain and driven by a main drive component, the method comprising the steps of:

- sampling output signals of a step speed sensor and a step detection sensor for a predefined period of time;

determining a measured step speed based on the step speed output signal;
determining step speed sensor type based on a frequency of the step speed output signal;
determining conveyor step size based on a correlation between the step speed and step detection output signals;
comparing the measured step speed with a predefined step speed;
comparing a cross-correlation between sensor output signals with a predefined tolerance;
determining safety control parameters only if both of the measured step speed and the cross-correlation between sensor output signals are within predefined tolerances;
modifying existing safety functions based on the safety control parameters; and
storing the modified safety control functions for reference.

17. The method of claim 16, wherein the step of sampling output signals further samples an output signal of a handrail sensor for the predefined period of time.

18. The method of claim 16, wherein the step of sampling output signals initiates in response to user input and only during normal conveyor operation.

19. The method of claim 16, wherein the correlation between the step speed and step detection output signals is determined using the number of step speed signal pulses per period of the step detection output signal.

20. The method of claim 16, wherein the safety control parameters include thresholds for step speed, reverse motion, step detection and stopping distance.

* * * * *